United States Patent [19]
Bertetti et al.

[11] Patent Number: 6,027,122
[45] Date of Patent: Feb. 22, 2000

[54] SEALING ASSEMBLY FOR A ROLLING ELEMENT BEARING

[75] Inventors: Paolo Bertetti, Turin; Pietro Antonio Peretti, Piscina; Angelo Vignotto, Turin, all of Italy

[73] Assignee: SKF Industrie S.P.A., Turin, Italy

[21] Appl. No.: 08/947,023

[22] Filed: Oct. 8, 1997

[30] Foreign Application Priority Data

Oct. 8, 1996 [IT] Italy ................................ TO96A0826

[51] Int. Cl.[7] ...................................................... F16J 15/32
[52] U.S. Cl. ........................... 277/402; 384/484; 277/352
[58] Field of Search ..................................... 277/402, 371, 277/372, 373, 352; 384/484, 485, 486

[56] References Cited

U.S. PATENT DOCUMENTS

| | | | |
|---|---|---|---|
| 3,064,982 | 11/1962 | Stephens | 277/402 |
| 3,519,316 | 7/1970 | Gothburg | 384/486 |
| 4,792,242 | 12/1988 | Colanzi et al. | 384/482 |
| 4,792,243 | 12/1988 | Takeuchi et al. | 384/486 |
| 5,042,822 | 8/1991 | Dreschmann et al. | 277/353 |
| 5,201,529 | 4/1993 | Heinzen . | |
| 5,261,752 | 11/1993 | Ouchi et al. | 384/448 |
| 5,431,413 | 7/1995 | Hajzler | 277/317 |
| 5,695,290 | 12/1997 | Mondak et al. | 384/485 |

FOREIGN PATENT DOCUMENTS

| | | |
|---|---|---|
| 2 574 501 | 6/1986 | France . |
| 30 01 319 | 8/1982 | Germany . |
| 33 40 524 | 5/1985 | Germany . |
| 506248 | 12/1954 | Italy . |
| 2 261 037 | 5/1993 | United Kingdom . |

*Primary Examiner*—Anthony Knight
*Assistant Examiner*—Karlena D. Schwing
*Attorney, Agent, or Firm*—Burns, Doane, Swecker & Mathis, L.L.P.

[57] ABSTRACT

A sealing assembly for a rolling element bearing includes first and second screens fixed respectively to first and second rings of the bearing, with each screen including a respective rigid reinforcement and a respective elastomeric covering. The first screen includes a sleeve portion and a flange portion and also includes two sealing lips which cooperate with a sealing surface of the second screen. The first screen also has an annular projection extending from the sleeve portion that is adapted to be interposed, together with an extension of the elastomeric covering, between the front surface of the first ring of the bearing and a shoulder of the bearing itself. The second screen has a phonic wheel defined by a flange portion of the rigid reinforcement and a magnetized portion of the elastomeric covering. The elastomeric covering of the second screen has a front surface projecting beyond the front surface of the first ring.

15 Claims, 1 Drawing Sheet

SEALING ASSEMBLY FOR A ROLLING ELEMENT BEARING

BACKGROUND OF THE INVENTION

The present invention concerns a sealing assembly for a rolling element bearing.

In particular, the assembly according to the present invention, as well as being capable of protecting the rolling bodies of the bearing from external contaminants and, at the same time, keeping the lubricating grease within the bearing, includes a signalling element capable of co-operating with a detector device outside the assembly; the assembly formed by the signalling device and the detector device enables the detection of the speed of rotation of the moving element of the bearing and/or a mechanical member possibly fixed thereto such as, for example, the wheel of a vehicle.

Assemblies of the type described above are known, in which the signalling element is a phonic wheel formed from magnetic material and integrated in the protective seal of the bearing; specifically, the phonic wheel is fixed to the rotating ring of the bearing and coupled with a fixed sensor connected, for example, to the fixed ring of the bearing.

Problems of positioning and fixing to the associated suspension strut may be encountered with sealing assemblies formed in this way. In fact, one of the two bearing rings is usually abutted against a shoulder on the strut, while a further shoulder is formed by a resilient ring fitted on the strut itself. However, due to the typical tolerances and errors in manufacturing processes, the dimensions of the bearing may not coincide perfectly with the space provided for its mounting; play may therefore be present between the bearing itself and the shoulders after mounting, which causes vibrations and therefore noise when the vehicle is operating.

SUMMARY OF THE INVENTION

The object of the present invention is to produce a sealing assembly for a rolling element bearing free from the disadvantages described and which is, in particular, simple and economic to construct and assemble.

According to the present invention a sealing assembly for a rolling bearing is provided, including a first screen fixed to a first bearing ring and a second screen fixed to a second bearing ring, the said first and second screens each including an associated rigid reinforcement and associated covering portion of elastomeric material; the said first screen including a sleeve portion and a flange portion and, in addition, sealing lips which cooperate with a sealing surface of the said second screen; characterised in that the said first screen has an annular projection extending from the said sleeve portion and interposable between a front surface of the said first ring and a resilient locking ring of the bearing.

BRIEF DESCRIPTION OF THE DRAWINGS

For a better understanding of the present invention, a preferred embodiment will now be described purely by way of non-limitative example, with reference to the accompanying drawings, in which.

DETAILED DESCRIPTION OF THE INVENTION

Figure 1:
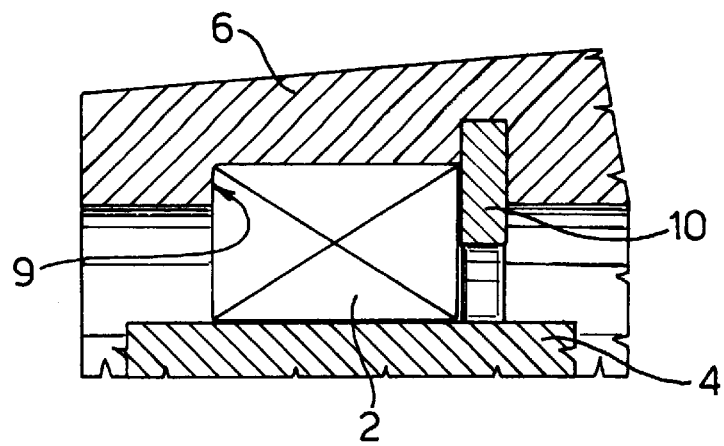
FIG. 1 illustrates schematically a section of a rolling element bearing mounted on a suspension strut.
Figure 2:
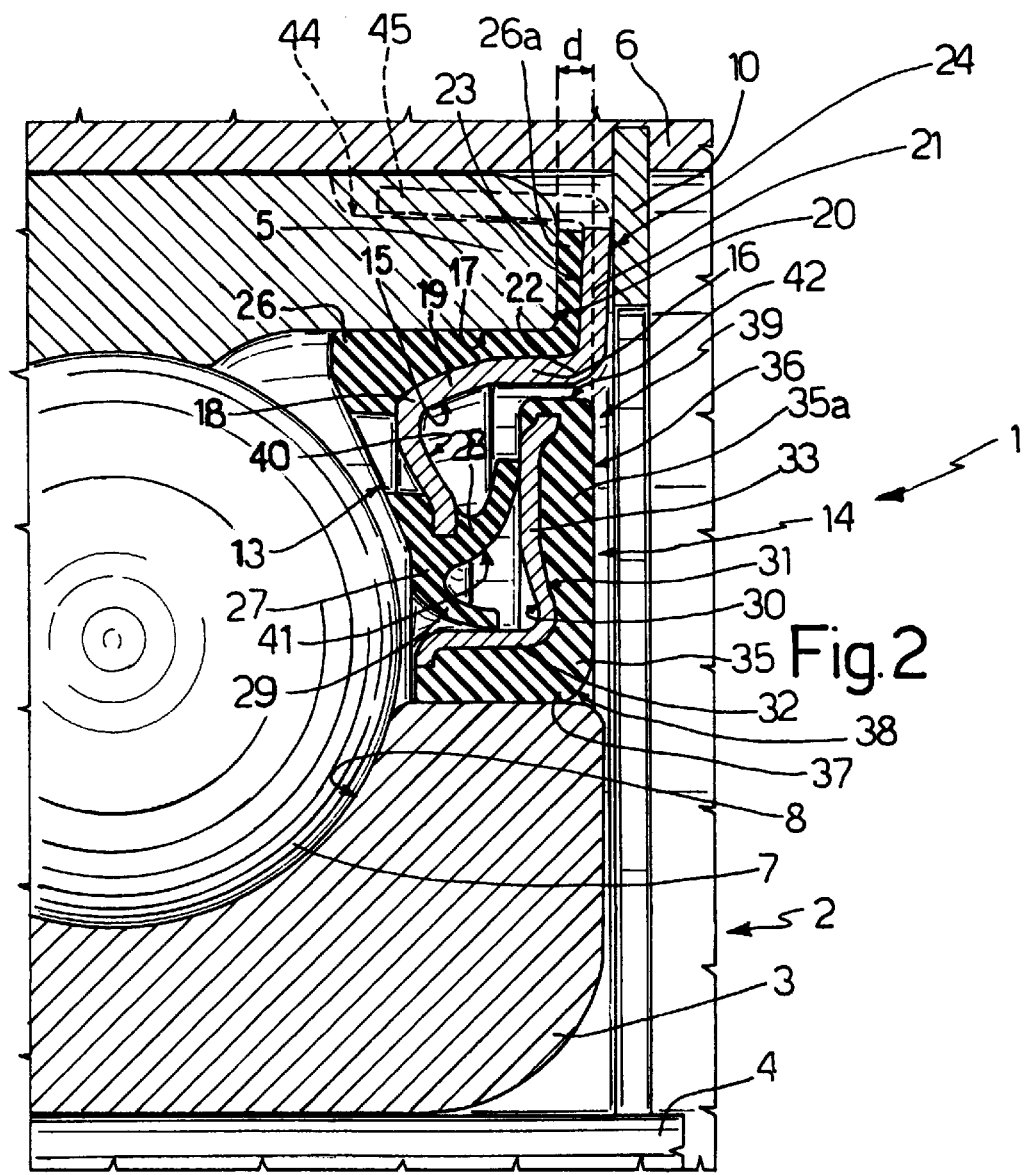
FIG. 2 illustrates, on an enlarged scale and in radial section, the bearing of FIG. 1 provided with a sealing assembly formed according to the present invention.

With reference to FIGS. 1 and 2, the reference numeral 1 indicates a sealing assembly for a rolling element bearing 2 of a vehicle.

The bearing 2 comprises: an inner, rotatable ring 3 which rotatably carries a wheel hub 4 of a vehicle; an outer, fixed ring 5 fixed to a strut 6 of the vehicle suspension; and a plurality of rolling bodies 7 housed in a space 8 defined between the rings 3 and 5. As illustrated in FIG. 1, the bearing 2 and sealing assembly 1 form a support unit fixed axially on one side by a shoulder 9 on the strut 6 and, on the other side, by a removable shoulder constituted by a resilient ring 10 housed partly within the strut 6.

According to the present invention, the assembly 1 includes a first screen 13 fixed to the fixed ring 5, and a second screen 14 fixed to the rotating ring 3, and disposed so as to close the space 8 to protect the rolling bodies 7 from external contaminants and keep the lubricating grease within the bearing 2.

In particular, the first screen 13 includes a rigid reinforcement or case 15 of, for example, metal, formed by a sleeve portion 16 facing a radial inner wall 17 of the rotatable ring 3, and a flange portion 18 which extends radially from a first end portion 19 of the sleeve portion 16 towards the rotatable ring 3, and formed so as to present a concave surface facing away from the space 8.

The reinforcement 15 also includes a rigid annular projection 21 extending from a second end portion 22 of the sleeve portion 16 in the opposite direction to the flange portion 18; this projection 21 has a first face 23 facing a front surface 20 of the ring 5, and a second face 24, opposite the first face, in contact with the resilient ring 10.

The first screen 8 also includes a covering portion 26 formed from elastomeric material and positioned, in use (FIG. 2), between the reinforcement 15 and the ring 5, covering the flange portion 18 facing the space 8. In particular, the covering portion 26 or, as referred to more succinctly below, the covering 26, has a portion or extension 26a interposed, in use, between the projection 21 and the front surface 20 of the bearing. Furthermore, the covering 26 has an end portion 27 from which an axial sealing lip 28 and a radial sealing lip 29 extend to cooperate with a sliding sealing surface 30 of the second screen 14.

The second screen 14 also includes a reinforcement or case 31 formed from a sleeve portion 32 and a flange portion 33, this latter extending towards the sleeve portion 16 of the first screen 13; the portions 32 and 33 also define the aforesaid sealing surface slidingly cooperating with the lips 28 and 29. In addition, the second screen 14 includes a covering portion 35 for the reinforcement or case 31, formed as a ring having an L-shape radial section formed from an elastomeric material filled with magnetisable metallic powder and interposed between the sleeve portion 32 and the ring 3, and which covers the flange portion 33 on the side opposite the space 8. The covering portion 35 or, as referred to more succinctly below, the covering or ring 35, has a front surface 36 which projects by a predetermined distance "d" from the front surface 20 of the ring 5.

In addition, the elastomeric covering 35 includes a corner portion 37 adjacent the ring 3 and having a bevel 38; the presence of this latter prevents bulges from forming (caused by interference) which would extend beyond the plane defined by the surface 36.

At least a portion 35a of the elastomeric covering 35 is filled with particles of magnetic powder, as described above, so as to form, after suitable magnetisation, a phonic wheel 39 capable of co-operating with a detector (not shown) fixed to the fixed ring 5 of the bearing 2.

The two screens 14 and 13 define between them two annular cavities 40 and 41 separated by the axial sealing lip 28, and an annular space 42 by means of which the cavity 4 communicates with the outside.

FIG. 2 also illustrates in broken outline a possible variant of the sealing assembly 1, in which the ring 5 has a continuous external radial seat 44 (or, alternatively, a plurality of external circumferential radial seats of limited extent), and the annular projection 21 is continued, folding into a L-shape, to form an annular extension 45 (or alternatively, a plurality of finger-like extensions) capable of coupling with the radial seat or seats 44 to ensure an anti-rotation locking of the screen 13 on the ring 5.

The advantages of the sealing assembly of the invention are clear from the above description. First of all, the interpositioning of the annular projection 21 and, additionally, the associated covering portion 26a between the front surface 20 of the ring 5 and the resilient ring 10, ensures the correct positioning of the bearing 2 on the strut 6, eliminating possible play and with the possibility of compensating for any interference by means of the deformability of the portion 26a itself. The presence of the projection 21 thus, on the one hand, eliminates the noisiness of the bearing 2 caused by any play and, on the other hand, limits the vibration of the phonic wheel 39 thereby improving its operation.

The sealing assembly 1 therefore has a three-fold function: as a screen for the space 8 housing the rolling bodies 7 so as to isolate them from external contaminants; to incorporate a signalling element, specifically the phonic wheel 39, capable of coupling with a fixed sensor element (not shown); and the function described above of ensuring the bearing 2 is coupled correctly with the suspension strut 6.

Furthermore, the projecting mounting of the second screen 14 with respect to the front surface 20 of the fixed ring 5 improves the coupling efficiency of the phonic wheel 39 with the fixed sensor.

Finally, it is clear that modifications and variations may be introduced into the sealing assembly described here without by this departing from the protective ambit of the present invention.

We claim:

1. A sealing assembly for a rolling element bearing, comprising a first screen fixed to a first ring of the bearing, and a second screen fixed to a second ring of the bearing, said first and second screens each including an associated rigid reinforcement and an associated covering portion formed from an elastomeric material; said first screen including a sleeve portion and a flange portion and also including sealing lips which co-operate with a sealing surface of said second screen, said rigid reinforcement of said first screen having an annular projection that extends radially from said sleeve portion in a direction opposite to said flange portion, said radially extending annular projection of said rigid reinforcement being interposed between a front surface of said first ring and a locking shoulder of the bearing that is separate from said first ring.

2. A sealing assembly according to claim 1, wherein said annular projection is covered on a side facing said first ring by an extension of said elastomeric covering of said first screen, said extension of said elastomeric covering of said first screen being interposed between said front surface of said first ring and said locking shoulder of the bearing that is separate from said first ring.

3. A sealing assembly according to claim 2, wherein said second screen includes a ring having an L-shape in radial section formed at least partly from the elastomeric material filled with magnetisable metallic powder, and the rigid reinforcement which cooperates with said lips of the first screen, said ring forming said covering portion and including a radial portion.

4. A sealing assembly according to claim 1, wherein said second screen is adapted to be mounted to project from said front surface of said first ring.

5. A sealing assembly according to claim 1, wherein said covering portion of said second screen has a bevel at a corner portion adjacent said second ring.

6. A support assembly for a wheel hub of a vehicle, comprising a rolling element bearing which includes a first, fixed ring, a second rotating ring and a plurality of rolling bodies housed in a space defined between said first and second rings; and at least one sealing assembly interposed between said first and second rings to close said space, said sealing assembly including a first screen fixed to said first ring of the bearing and a second screen fixed to said second ring of the bearing, said first and second screens each including an associated rigid reinforcement and an associated covering of elastomeric material, said first screen including a sleeve portion and a flange portion, and also including sealing lips which co-operate with a sealing surface of said second screen, said rigid reinforcement of said first screen having an annular projection which extends radially, together with a portion of said elastomeric covering, to cover a radially extending front surface of said first ring so that said portion of the elastomeric covering is positioned between the radially extending annular projection of said rigid reinforcement and said radially extending front surface of the first ring.

7. A support assembly according to claim 6, wherein said first ring has a radial seat and said projection has an annular extension engaging said radial seat.

8. A support assembly according to claim 6, wherein said second screen includes a ring having an L-shape in radial section formed at least partly from the elastomeric material filled with magnetisable metallic powder and the rigid reinforcement which cooperates with said sealing lips of the first screen.

9. A support assembly according to claim 6, wherein said second screen projects from said front surface of said first ring.

10. A support assembly according to claim 6, wherein said covering portion of said second screen has a bevel at a corner portion adjacent said second ring.

11. A sealing assembly mounted in a rolling element bearing, comprising a first screen fixed to a first ring of the bearing and a second screen fixed to a second ring of the bearing, said first and second screens each including a rigid reinforcement and a covering portion formed from an elastomeric material, said first screen including a sleeve portion and a flange portion, said first screen also including sealing lips cooperating with a sealing surface of said second screen, said rigid reinforcement of said first screen having a radially outwardly extending annular projection, said radially outwardly extending annular projection of said first screen along with a portion of said elastomeric material of said first screen being positioned between a locking shoulder of the bearing and an axially facing front surface of said first ring.

12. A sealing assembly according to claim 11, wherein said first ring has a radial seat and said annular projection has an annular extension engaging said radial seat.

13. A sealing assembly according to claim 11, wherein said second screen includes a ring having an L-shape in radial section formed at least partly from the elastomeric material filled with magnetisable metallic powder.

14. A sealing assembly according to claim 11, wherein said second screen projects from said front surface of said first ring.

15. A sealing assembly according to claim 11, wherein said covering portion of said second screen has a bevel at a corner portion adjacent said second ring.

* * * * *